United States Patent
Rodgers

(10) Patent No.: US 11,675,492 B2
(45) Date of Patent: Jun. 13, 2023

(54) DETERMINING USER ENGAGEMENT IN CONTENT BASED ON SCROLLING EVENTS

(71) Applicant: Oracle International Corporation, Redwood Shores, CA (US)

(72) Inventor: Michael Patrick Rodgers, Rochester, MN (US)

(73) Assignee: Oracle International Corporation, Redwood Shores, CA (US)

(*) Notice: Subject to any disclaimer, the term of this patent is extended or adjusted under 35 U.S.C. 154(b) by 35 days.

(21) Appl. No.: 17/150,749

(22) Filed: Jan. 15, 2021

(65) Prior Publication Data
US 2022/0229529 A1 Jul. 21, 2022

(51) Int. Cl.
| | |
|---|---|
| *G06F 3/0485* | (2022.01) |
| *G06F 3/01* | (2006.01) |
| *G06N 20/00* | (2019.01) |
| *G06F 9/451* | (2018.01) |

(52) U.S. Cl.
CPC ............ *G06F 3/0485* (2013.01); *G06F 3/013* (2013.01); *G06F 9/451* (2018.02); *G06N 20/00* (2019.01)

(58) Field of Classification Search
CPC ........ G06F 3/0485; G06F 3/013; G06F 9/451; G06F 2201/86; G06F 11/3438; G06N 5/04
See application file for complete search history.

(56) References Cited

U.S. PATENT DOCUMENTS

| | | | |
|---|---|---|---|
| 2014/0229679 A1* | 8/2014 | Santhanam | G06F 16/9574 711/135 |
| 2014/0280890 A1* | 9/2014 | Yi | H04L 67/22 709/224 |
| 2015/0205475 A1* | 7/2015 | Donelan | G06F 3/0485 715/784 |
| 2015/0324362 A1* | 11/2015 | Glass | G06F 16/24578 707/725 |
| 2016/0371708 A1* | 12/2016 | Chuang | G06Q 30/0201 |

* cited by examiner

*Primary Examiner* — Tan H Tran
(74) *Attorney, Agent, or Firm* — Invoke

(57) ABSTRACT

Techniques for measuring a user's level of interest in content in an electronic document are disclosed. A system generates a user engagement score based on the user's scrolling behavior. The system detects one scrolling event that moves content into a viewport and another scrolling event that moves the content out of the viewport. The system calculates a user engagement score based on the duration of time the content was in the viewport. The system may also detect a scroll-back event, in which the user scrolls away from content and back to the content. The system may then calculate or update the user engagement score based on the scroll-back event.

21 Claims, 9 Drawing Sheets

DETERMINING USER ENGAGEMENT IN CONTENT BASED ON SCROLLING EVENTS

TECHNICAL FIELD

The present disclosure relates to determining a level of user engagement with content of an electronic document based on user scrolling behavior. In particular, the present disclosure relates to computing user engagement with content items in a scrollable electronic document based on applying rules based on scrolling behavior, other user interaction behavior, and content attributes.

BACKGROUND

Electronic media providers identify the extent to which users engage with content in electronic media to customize media provided to the users. For example, a media provider may want to target advertising to the user to increase the likelihood the user will respond to the advertising. Alternatively, the media provider may target content to the user to increase the likelihood that the user will return to use the electronic media.

Typically, a provider may determine that a user engaged content when the user clicks on elements associated with the content. For example, the user may click on a link to learn more about the content. In addition, the user may click on an icon indicating a reaction to the content, such as a "like" icon. However, some types of content may not have fields a user can interact with. For example, a user may view an image that does not include any associated link. Alternatively, the user's typical behavior may include engaging with content without interacting with the content. A media provider that tracks only user clicks on interactive elements of an electronic document may not accurately capture a user's level of engagement with the content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
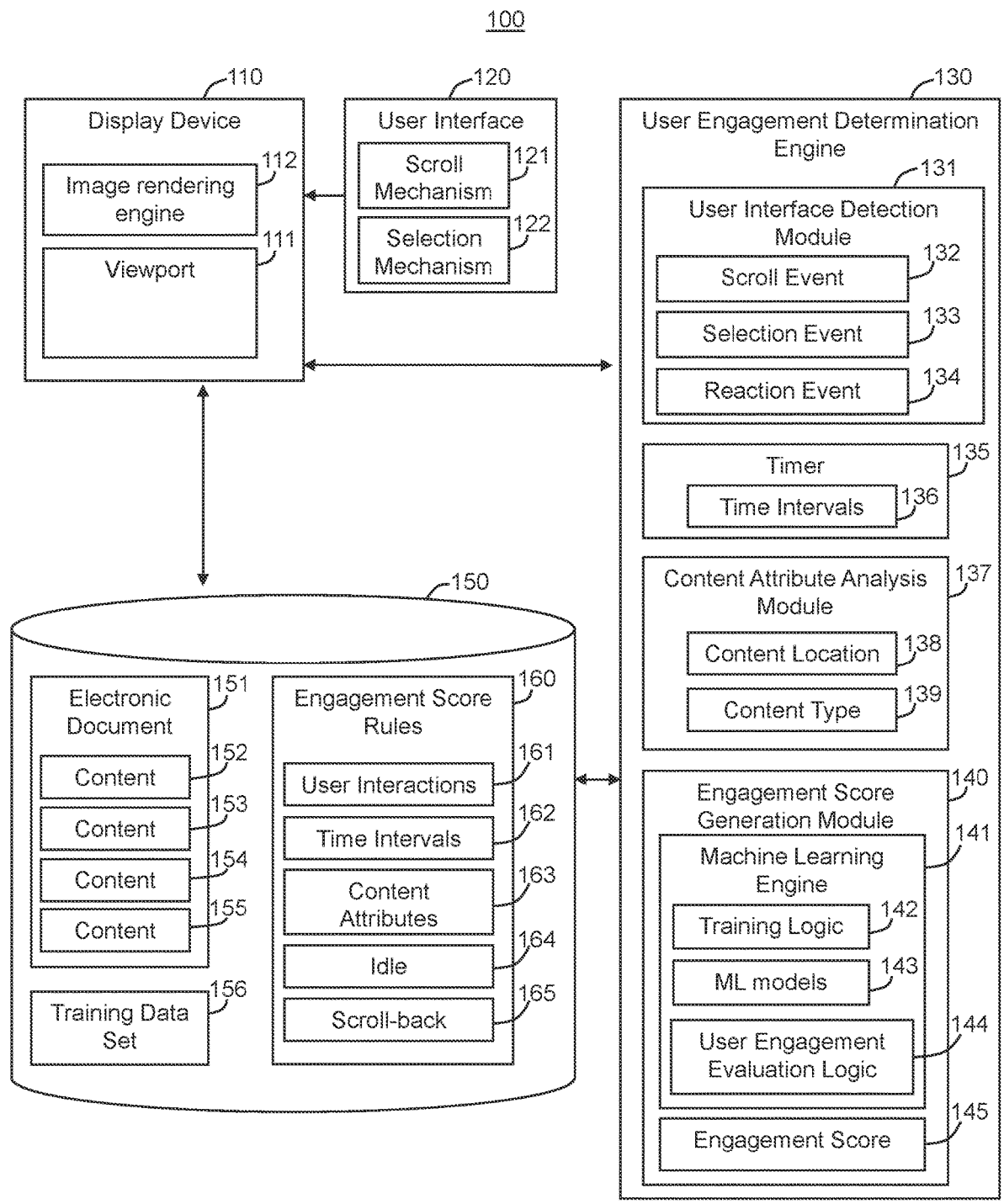
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ENGAGEMENT DETECTION SYSTEM
3. GENERATING USER ENGAGEMENT SCORE FOR CONTENT IN AN ELECTRONIC DOCUMENT
4. MACHINE LEARNING ENGINE TRAINING
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

A user engagement score is one measure of a user's level of interest in content in an electronic document. One or more embodiments generate a user engagement score based on the user's scrolling behavior. The user engagement score may be based on the scrolling behavior, alone. Alternatively, the user engagement score may be based on the scrolling behavior in combination with other actions indicating the user's interest in the content.

One or more embodiments compute a user engagement score based on a duration of a time interval during which content is within a viewport of a display device. The time interval may begin after a scrolling event that moves the content into the viewport. The time interval may end after another scrolling event that moves the content out of the viewport. The system computes the user engagement score in proportion to the duration of the time interval.

The system may compute the user engagement score based on a difference between (a) the calculated time interval during which content is within the viewport of the display device and (b) an expected time interval estimated for a user's viewing of the content based on the content type. The system may generate a relatively low engagement score if the calculated time interval is less than the expected time interval. The system may generate a relatively high engagement score if the calculated time interval is greater than the expected time interval.

One or more embodiments compute a user engagement score based on a duration of a time interval during which content is within a user engagement region within the viewport of a display device. A user engagement region is a region of the viewport corresponding to the user's attention. For example, if the user typically clicks on content while the content is displayed in the top third of the viewport, the system may classify the top third of the viewport as the user engagement region. The duration of the time interval, used for computing the user engagement score, corresponds to a duration of time during which the content is within the top third of the viewport. Periods of time, during which the content is in the viewport but not in the top third of the viewport, are not included in the time interval used for computing the user engagement score.

One or more embodiments implement a machine learning model to determine a user engagement region. The system trains the machine learning model using detected user interactions with sets of content such as content clicks. The training data also identifies a location of the content within the viewport at the time of the user interaction. Based on the training data, the machine learning model determines a user engagement region.

One or more embodiments compute a user engagement score based on whether or not a scroll-back action was detected. In a scroll-back action, a user scrolls content out of a viewport and scrolls back to the content to move the content back into the viewport. Since a scroll-back action indicates a user is interested in the content, detection of a scroll-back action results in a higher user engagement score than non-detection of a scroll-back action.

One or more embodiments described in this Specification and/or recited in the claims may not be included in this General Overview section.

2. Engagement Detection System

FIG. 1 illustrates a system 100 in accordance with one or more embodiments. As illustrated in FIG. 1, system 100 includes a display device 110 and user interface 120 that interacts with the display device 110. The display device 110 includes a viewport 111 and an image rendering engine 112 that displays content in the viewport 111. In one or more embodiments, the viewport 111 is a screen in the display device 110 and the image rendering engine 112 includes software running on hardware of the display device to render software elements as images on the screen. In one or more embodiments, the image rendering engine is a browser.

The user interface 120 includes a scroll mechanism 121 and a selection mechanism 122. The scroll mechanism 121 and selection mechanism 122 may be implemented as hardware and as a combination of software running on hardware. In one or more embodiments, the scroll mechanism 121 is a scroll wheel or a ball of a mouse. In addition, or in the alternative, the scroll mechanism 121 may be a selection of a key on a keypad that is programmed to initiate a scroll of a visual display. In addition, or in the alternative, the scroll mechanism 121 may be a linear movement of a mouse in a setting in which the linear movement causes scrolling of a visual display.

In one or more embodiments, the display device 110 and the user interface 120 are integrated into the same device, such as a handheld device. The scroll mechanism 121 may include a user interaction with the viewport 111 of the handheld device to cause a scrolling function of a visual display. For example, the viewport 111 may include a touchscreen. The user may interact with the touchscreen to scroll through an electronic document.

The selection mechanism 122 may be, for example, a button, a user interaction with the viewport, such as a tapping motion, or any other user interaction with the user interface 120 that causes a selection of a visual element displayed in the viewport 111.

In one or more embodiments, user interface 120 refers to hardware and/or software configured to facilitate communications between a user and the display device 110. In one or more embodiments, display device 110 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of display device 110 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the display device 110 may be specified in one or more other languages, such as Java, C, or C++.

The system 100 further includes a data repository 150 and a user engagement determination engine 130. The data repository 150 stores data accessed by the display device 110 to display content in the viewport 111. The data repository 150 further stores data accessed by the user engagement determination engine 130 to analyze a user interaction with the viewport 111 and determine a level of user engagement with content displayed in the viewport 111.

In one or more embodiments, the data repository 150 is any type of storage unit and/or device (e.g., a file system, database, collection of tables, or any other storage mechanism) for storing data. Further, a data repository 150 may include multiple different storage units and/or devices. The multiple different storage units and/or devices may or may not be of the same type or located at the same physical site. Further, the data repository 150 may be implemented or may execute on the same computing system as one, or both, of the display device 110 and the user engagement determination engine 130. Alternatively, or additionally, the data repository 150 may be implemented or executed on a computing system separate from one, or both, of the display device 110 and the user engagement determination engine 130. The data repository 150 may be communicatively coupled to the display device 110 and the user engagement determination engine 130 via a direct connection or via a network.

The data repository 150 stores an electronic document 151 including content 152-155. Content 152-155 includes images, text, graphs, icons, interactive elements (such as buttons, links to other documents, and selectable icons) to be displayed in the viewport 111. The electronic document 151 is visually displayed in the viewport 111. In one or more embodiments, the electronic document 151 is obtained via a network, such as the Internet, to be displayed by the display device 110. In one or more embodiments, the browser 112 converts the data from the electronic document 151 into a form to be displayed in the viewport 111. In one or more embodiments, the browser 112 generates a scrollable image in the viewport 111 in which the subset of content items 152-155 displayed in the viewport 111 is changed according to a scrolling action of the scrolling mechanism 121.

The user engagement determination engine 130 analyzes the viewport 111, the content 152-155, and a scroll action and/or selection action to generate an engagement score 145. The user engagement determine engine 130 includes a user interface detection module 131 to detect attributes of a user interface with the content 152-155. The user interface detection module 131 identifies a scroll event 132 by analyzing attributes of a scrolling action of content 152-155 in the viewport 111. The user interface detection module 131 identifies a selection event 133 by analyzing a user selection action in relation to the content 152-155 displayed in the viewport 111. The user interface detection module 131 identifies a reaction event 134 by analyzing a user reaction to the content 152-155 displayed in the viewport 111.

The user engagement determination engine 130 includes a timer 135 to capture time intervals 136 based on the intervals of time that the content 152-155 is displayed in the viewport 111.

The user engagement determination engine 130 includes a content attribute analysis module 137 to identify content location 138 information corresponding to a position of content within the viewport 111. The content attribute analysis module 137 also identifies a content type 139 of content within the viewport 111. Content type may correspond to a data type of the content, such as images, graphics, text, icons, video, and interactive icons (such as a "play" button to play audio or video). Content type 139 may also be further categorized according to the information conveyed by the data, such as politics-themed content, content from friends or family, entertainment-type content, content related to a geographic location, a person, business, or other entity, etc.

In one or more embodiments, the content attribute analysis module 137 identifies content location 138 by analyzing the code for displaying the content in the viewport 111. In addition, or in the alternative, the content attribute analysis module 137 may include device that tracks the gaze of a user. The device may identify the direction of the user's gaze relative to the content.

The user engagement determination engine 130 includes an engagement score generation module 140 that generates an engagement score 145 based on input data, including: the scroll event 132, selection event 133, reaction event 134, time intervals 136, content location 138, and content type 139. The engagement score generation module 140 generates the engagement score 145 based on rules 160. The engagement score rules 160 includes rules specifying user interactions 161, specified time intervals 162, content attributes 163, a detected idle state 164 of a user, and a detected scroll-back 165 action performed by a user. The engagement score generation module 140 includes a machine learning engine 141. The machine learning engine 141 includes training logic 142 to train one or more machine learning models 143. The training logic 142 trains the machine learning models 143 based on a training data set 156 stored in the data repository 150. The training data set 156 may include, for example, historical data regarding content attributes and historical engagement scores assigned to historical content data. In one or more embodiments, the machine learning engine 141 further trains the machine learning models 143 using one or more validation data, to validate a machine learning model, and/or one or more test data sets, to further test the trained machine learning model. The machine learning engine 141 includes user engagement evaluation logic 144 to obtain content information, apply a trained machine learning model 143, and generate an engagement score 145 for the content 152-155. In one or more embodiments, the user engagement evaluation logic 144 further applies a machine learning model to identify a user engagement region within the viewport 111 for a particular user.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a user engagement determination engine 130 refers to hardware and/or software configured to perform operations described herein for generating a user engagement score for content displayed in a viewport of a display device. In one or more embodiments, the user engagement determination engine 130 further refers to hardware and/or software configured to perform operations described herein for identifying a user engagement region within a viewport. Examples of operations for generating the engagement score and identifying the user engagement region are described below with reference to FIG. 2.

In an embodiment, the user engagement determination engine 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating Engagement Score for Content in an Electronic Document

Figure 2:
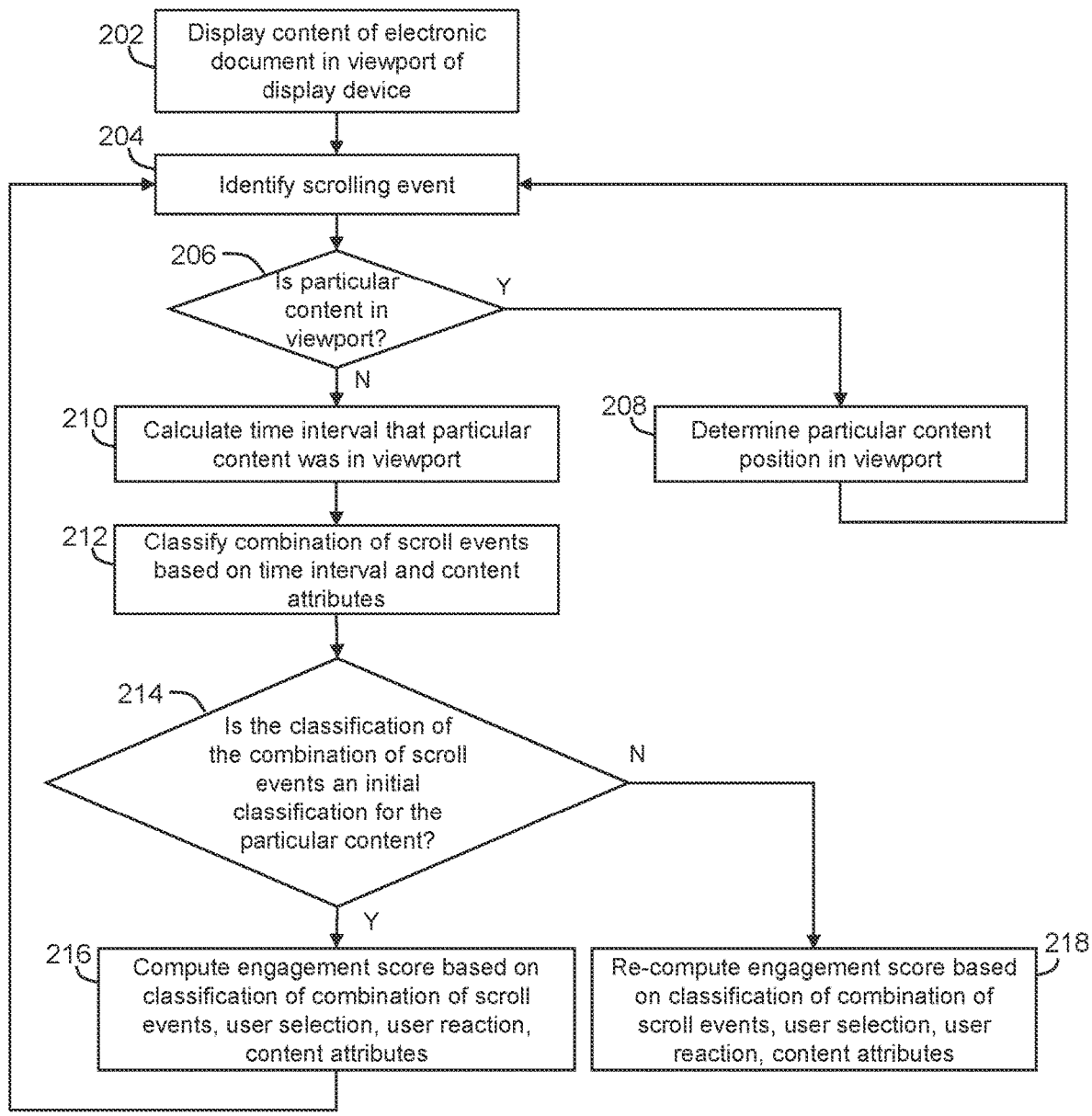
FIG. 2 illustrates an example set of operations for generating a user engagement score in accordance with one or more embodiments.

FIG. 2 illustrates an example set of operations for generating an engagement score for content in an electronic document in accordance with one or more embodiments.

A system displays content of an electronic document in a viewport of a display device (Operation 202). In one or more embodiments, the electronic document is a scrollable document having content outside the boundaries of the viewport. When a user scrolls through the electronic document, the content in the electronic document moves relative to the viewport. Content which was previously in the viewport may be moved out of the viewport. Similarly, content that was outside the viewport may be moved into the viewport.

The system identifies a scrolling event (Operation 204). In one or more embodiments, the scrolling event occurs when a user spins a scroll wheel, swipes a touchscreen, rolls a trackball, or performs any other action causing content within the electronic document to scroll relative to the viewport. In one or more embodiments, the electronic document is a web page generated by a social media provider. The web page continually generates new content as a user scrolls through the document. For example, a browser may display particular content in the viewport. As the scrolling event occurs, the browser may move the particular content toward an upper boundary of the viewport. As the scrolling continues, the content incrementally is removed from the viewport at the upper edge of the viewport. At the same time, new content is incrementally introduced at a lower edge of the viewport. The browser may further load additional content to be displayed as the user continues to scroll through the electronic document.

The system identifies, after the scroll event, whether particular content is located within the viewport (Operation 206). The content includes any type of content capable of being displayed, and the viewport includes any type of display. For example, the system may detect a particular image is located within the boundaries of a display screen.

In one or more embodiments, the particular content is part of an electronic document or file. The electronic document or file is converted to a visual display by display software, such as a browser. In one or more embodiments, the display software stores information identifying a top edge of a viewable image on a screen and a bottom edge of the viewable image on the screen. The browser identifies any content having portions between the top and bottom edges of the screen. In addition, or in the alternative, the browser may store information identifying a right edge and left edge of the viewable image on the screen. The browser may identify any content having portions between the right edge and left edge of the screen.

The system determines a position of the particular content in the viewport (Operation 208). For example, the system may define a predetermined region within the viewport as a "user engagement region" in which a user is most likely to engage content. As an example, a top third of a viewport may be defined as a user engagement region. The system may determine whether the particular content was located within the top third of the viewport, and for how long the particular content was within the top third of the viewport. In one embodiment, the system determines the position of the particular content in the viewport by comparing a position, such as a pixel address of a top or bottom of the particular content, with an address corresponding to an edge of the viewport. In another embodiment, the system utilizes eyeball-tracking technology to identify the "user engagement region." The system may track an eyeball position in real-time to determine whether the user's gaze was directed at the particular content. Alternatively, or in addition, the system may define a "user engagement region" using historical eyeball position data to identify a region within the viewport where the user historically has engaged with content.

In one or more embodiments, the system determines the position of the content relative to a user engagement position within the viewport by applying machine learning models. The system may use historical data regarding where the user has engaged with content in the past, in combination with content attribute information, to determine whether the particular content is within a user engagement area specified by a machine learning model.

The system may determine whether the entire particular content is within the viewport or whether only a portion of the content has been moved into the viewport. For example, if the particular content is an image, the system may determine whether, after the scroll event, the entire image has been moved into the viewport or whether only an upper portion of the image has been moved into the viewport from a lower boundary of the viewport. In one or more embodiments, the system may determine that the content is within the viewport if a predetermined percentage of the content is within the viewport.

Based on determining the position of the particular content in the viewport, the system again identifies a scrolling event (Operation 204).

The system again determines whether the particular content is located in the viewport (Operation 206). If the system determines that the content is no longer located within the viewport, the system calculates a time interval that the particular content was within the viewport (Operation 208). In one or more embodiments, the system begins a timer when the particular content is first detected within the viewport, and the system stops the timer when the content is first determined to be located outside the viewport.

In addition, or in the alternative, the system may begin a timer when the particular content is detected within the user engagement region of the viewport. The system may stop the timer when the particular content is no longer detected within the user engagement area of the viewport. For example, if the user engagement area is defined as the top third of the viewport, the system may not begin the timer when the particular content is displayed in the bottom two thirds of the viewport. The system may only begin the timer when the particular content moves from the bottom two thirds into the top third of the viewport as a result of a scrolling event.

In one or more embodiments, the timer runs in real-time as the user interacts with the display device to scroll through the electronic document. In addition, or in the alternative, the system may store usage data of a user's viewing session. The usage data may be transmitted from a display device to a remote computer to analyze the user's viewing session. For example, a display device or browser may store user data, including viewport data, content displayed, scroll events, and user selection and reaction events. The user data may be transmitted to a remote computer for analysis. The remote computer may analyze the user data and identify a duration of time in which the particular content was located within the viewport.

Based on the calculated time interval and the position of the particular content within the viewport, the system classifies the combination of scroll events associated with the particular content being displayed in the viewport. (Operation 212). The combination of scroll events includes the scroll event that caused the particular content to be displayed in the viewport and the scroll event that cause the particular content to no longer be displayed in the viewport. The combination of scroll events may also include any intervening scroll events that moved the particular content within the viewport.

Classifying the combination of scroll events includes: determining whether the user stopped scrolling while the content was in the viewport; determining whether the user stopped scrolling while the content was in an engagement region of the viewport; determining whether the user stopped long enough to view the content; and determining whether the time interval was longer than an expected time for engaging the content. For example, the system may identify a time of three (3) to ten (10) seconds as an expected engagement time for an image. If the system identifies the user stopped scrolling for five (5) minutes with the image in the engagement area of the viewport, the system may classify the scrolling combination of scrolling events as "idle," indicating the user idled and did not engage the particular content. Alternatively, the system may analyze content position data and the calculated time interval to determine the user stopped scrolling for five (5) seconds while the image was in the viewport.

The system determines whether the classification of the combination of scroll events is the initial classification of the combination of scroll events for the particular content (Operation 214). For example, the system may determine that the classification of the combination of scroll events is the initial classification of the classification of scroll events based on identifying only one instance of the particular content appearing in the viewport and only one instance of the particular content being moved out of the viewport by a scrolling action.

The system computes an engagement score for the particular content based on the classification of the combination of scroll event (Operation 216). In one or more embodiments, the system applies a set of rules to compute the engagement score. For example, one rule may specify that stopping a scrolling action with particular content in the viewport for a time interval less than a threshold time interval results in assigning the content with a low based engagement score. Another rule may specify that stopping a scrolling action with particular content in the viewport for a time interval longer than an expected time interval for engaging the content also results in assigning the content with a low base engagement score. Another rule may specify that stopping a scrolling action with particular content in the viewport for a time interval within an expected time interval for engaging the content results in assigning the content with a high base engagement score.

In one or more embodiments, the engagement score is a numerical value within a predetermined range. For example, the engagement score may be a value from 1-10. If the system determines the user stopped scrolling with the content in the viewport for a time interval shorter than the expected engagement time interval, the system may assign the content a base engagement score of 1. If the system determines the user stopped scrolling with the content in the viewport for a time interval within the expected engagement time interval, the system may assign the content base engagement score of 6.

In one or more embodiments, the system computes the engagement score without taking into account data regarding a user selection action. For example, a user may scroll through the particular content without selecting any fields or icons. Alternatively, the content may not have any selectable fields or icons. According to one or more embodiments, the system is able to assign an engagement score to content based on scrolling behavior, even without information regarding user selection behavior. Accordingly, the system may calculate an engagement score based on the user's scrolling behavior, alone. The system may determine that certain scrolling behavior corresponds to a higher engagement score than other scrolling behavior.

In addition, or in the alternative, the system may consider additional factors, in addition to scrolling behavior, to calculate the engagement score. Examples of additional factors include: whether the user interacted with content to make a selection, such as clicking on a link; whether the user "reacted" to the content, such as with an icon representing the user liked the content, disliked the content, or forwarded the content; attributes of the content, such as the type of content and a location of the content relative to a user engagement region; and information about the user's historical engagement with content. For example, the user may apply a rule to assign the content with a base engagement score based on the user's scrolling behavior. The system may adjust the base engagement score upwards and downwards by applying additional rules related to the content type and other user interactions with the content.

In one or more embodiments, the system applies machine learning to calculate the engagement score. A machine learning model may be trained to identify various factors that indicate a user's level of engagement with content and generate an engagement score based on the various factors.

Upon computing the initial engagement score (Operation 216), the system again identifies a scrolling event (Operation 204).

The system repeats the process of identifying a combination of scrolling events (Operation 204) that result in the particular content being located in the viewport and then no longer located in the viewport (Operation 206). The system repeats the process of determining the content position within the viewport (Operation 208), calculating the time interval that the particular content was in the viewport (Operation 210), and classifying the combination of scroll events (Operation 212).

In addition to the classifications of the initial combination of scroll events, the system further determines in Operation 212 whether the user scrolled back to engage the particular content. In one or more embodiments, the system determines that a scroll-back event, in which a user scrolls away from content and then scrolls back to the content, corresponds to a high user engagement of the particular content. For example, a user may initially scroll quickly past an image. After scrolling past the image, the user may scroll back to view the image for an interval of time corresponding to an expected time for engagement.

The system determines that the classification of the scroll events is not the initial classification for the particular content (Operation 214). For example, the system may determine that there are two scrolling events identified in which the content was moved into the viewport and two scrolling events in which the content was moved out of the viewport.

The system re-computes an engagement score based on the classification of the combination of scroll events (Operation 218). In one or more embodiments, a "scroll-back" combination of scrolling events provides a higher contribution to an engagement score than merely scrolling by or stopping on content. While stopping on content while scrolling through content may indicate a certain level of engagement, scrolling away from the content then scrolling back to engage the content may indicate the user thought about the content after it was out of the viewport, indicating a relatively high level of user engagement. Accordingly, when computing the engagement score for the particular content (Operation 218), the system may compute a higher engagement score for content that was the subject of a scroll-back event than for content that the user scrolled past in an initial scrolling event.

In one or more embodiments, the system may also consider other factors to re-calculate the engagement score, including: a user selection of content, a user reaction to content, and attributes of the content, as discussed above.

One or more operations illustrated in FIG. 2 may be modified, rearranged, or omitted all together. Accordingly, the particular sequence of operations illustrated in FIG. 2 should not be construed as limiting the scope of one or more embodiments.

4. Machine Learning Engine Training

Figure 3:
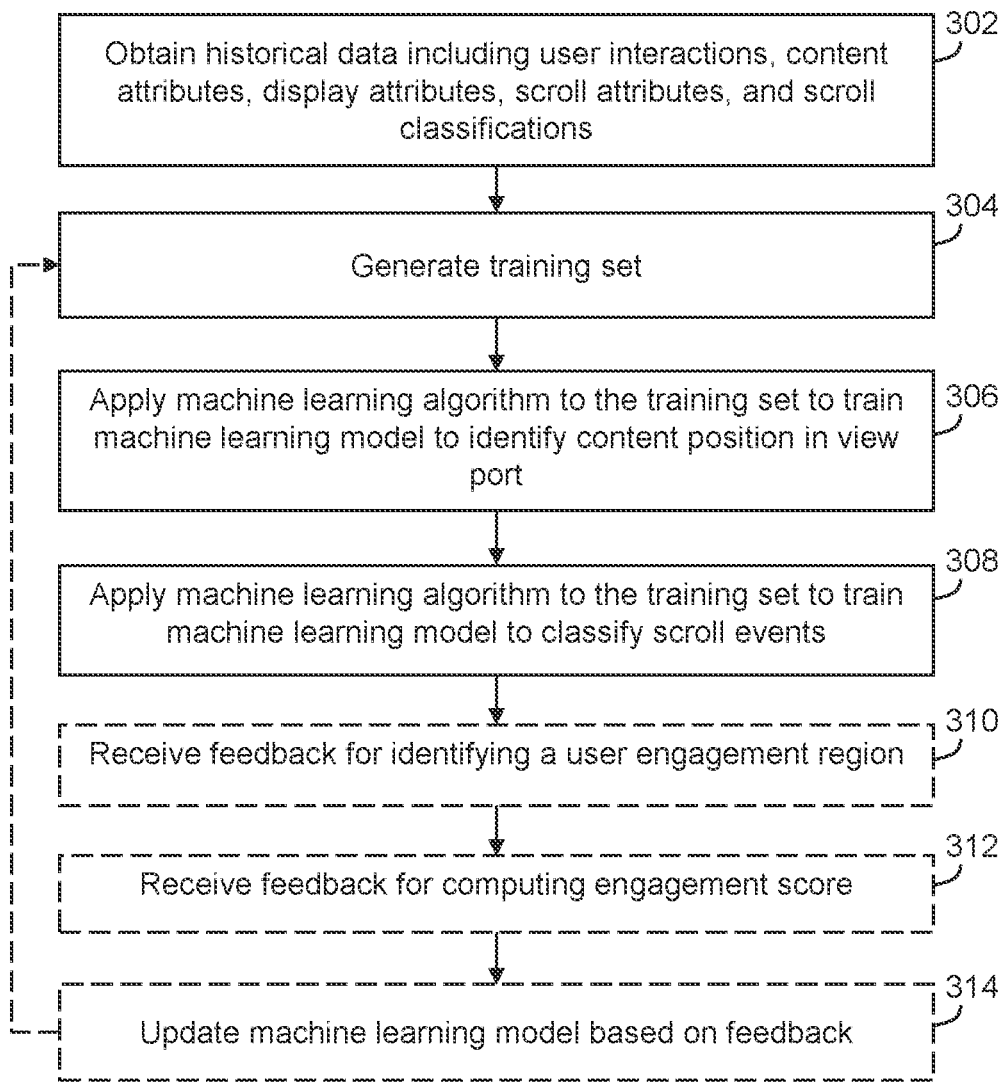
FIG. 3 illustrates an example of operations for training a machine learning model in accordance with one or more embodiments.

FIG. 3 illustrates an example of operations for training a machine learning model to identify a user engagement region of a viewport and to compute an engagement score according to one or more embodiments.

A machine learning engine obtains historical data including prior indicators of user engagement, including: prior items of content displayed in a viewport and classifications for the items of content, historical user scrolling behavior, a user selection of an interactive element in a viewport, a user reaction to content in a viewport, third party data specifying regions of a viewport in which users typically engage content, data from devices tracking eyeball positions of users as the users engage content in a viewport, and historical data of the types of content a particular user has engaged (Operation 302). For example, the historical data may indicate that a particular user has in the past most often engaged content in the middle region of a viewport and not at the top and bottom regions of the viewport. The historical data may indicate that the particular user has typically engaged images rather than text content. The historical data may also indicate that this particular user more often engaged content related to sports than politics.

In addition to including data for a particular user, the historical data may include information related to other users or groups of users. For example, the historical data may indicate that users in a particular geographic region are more likely to engage content related to sports teams in the geographic region.

The historical data also includes historical engagement scores for the historical items of content displayed in the viewport.

The machine learning engine generates training data sets based on the historical data (Operation 304). The training data sets may include subsets of the historical data selected to represent different types of content items displayed at different locations in a viewport. The training data sets also include engagement scores for the different content items.

The machine learning engine applies a machine learning algorithm to the training set to train a machine learning model to identify an engagement region of a viewport for a particular user (Operation 306). The machine learning engine executes an algorithm using as inputs the content attributes, including: content type, content position in a viewport, and user interactions with content. The machine learning engine applies the machine learning algorithm to predict a user-engagement region. The machine learning engine compares the predicted user-engagement region with previously-identified user engagement regions, and adjusts parameters of the machine learning algorithm based on differences between the predicted user engagement region and the previously-identified user engagement regions.

The machine learning engine also applies a machine learning algorithm to the training set to train a machine learning model to compute engagement scores for content items displayed in a viewport (Operation 308). The machine learning engine executes an algorithm using as inputs the content attributes, including scrolling behavior of a user. The machine learning engine generates engagement scores based on the executed algorithm. The machine learning engine compares the engagement scores with target values for the engagement scores and adjusts parameters of the machine learning algorithm based on differences between the engagement scores and the target values.

In one embodiment, the machine learning model receives feedback based on the output values for the user engagement region of the viewport (Operation 310). The machine learning model may provide output values to a user that identify a particular region as being the user engagement region. The user may correct, approve, or adjust the values to provide new target values for the machine learning model.

For example, the machine learning model may identify a region in an upper left portion of a viewport as being a region in which a user is most likely to engage content in the viewport. The machine learning model may receive user feedback to expand the dimensions of the user engagement region to include the upper right portion of the viewport. The machine learning engine updates the machine learning model based on the feedback (Operation 314).

In one embodiment, the machine learning model receives feedback based on the output values for the engagement scores for content items displayed in a viewport (Operation 312). The machine learning model may provide to a user a list of content items and engagement scores for the content items. The user may correct, approve, or adjust the values to provide new target values for the machine learning model.

For example, the machine learning model may assign a relatively low engagement score to a content item based on the content item having a low representation in the training data set. A user may provide feedback to the machine learning engine to increase the engagement score for the content item. The machine learning engine updates the machine learning model based on the feedback (Operation 314).

The machine learning engine applies the updated machine learning model to the training datasets and repeats the process of comparing output values to target values, receiving feedback, and updating the machine learning model. In one or more embodiments, the machine learning model is subsequently compared to a validation dataset to validate and refine the machine learning model. In one or more embodiments, the machine learning model may be compared with a final test dataset prior to applying the machine learning model to incoming data flows.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 4A to 4E illustrate an example embodiment of classifying scrolling events and generating an engagement score based on the scrolling events based on one or more embodiments.

Figure 4A:
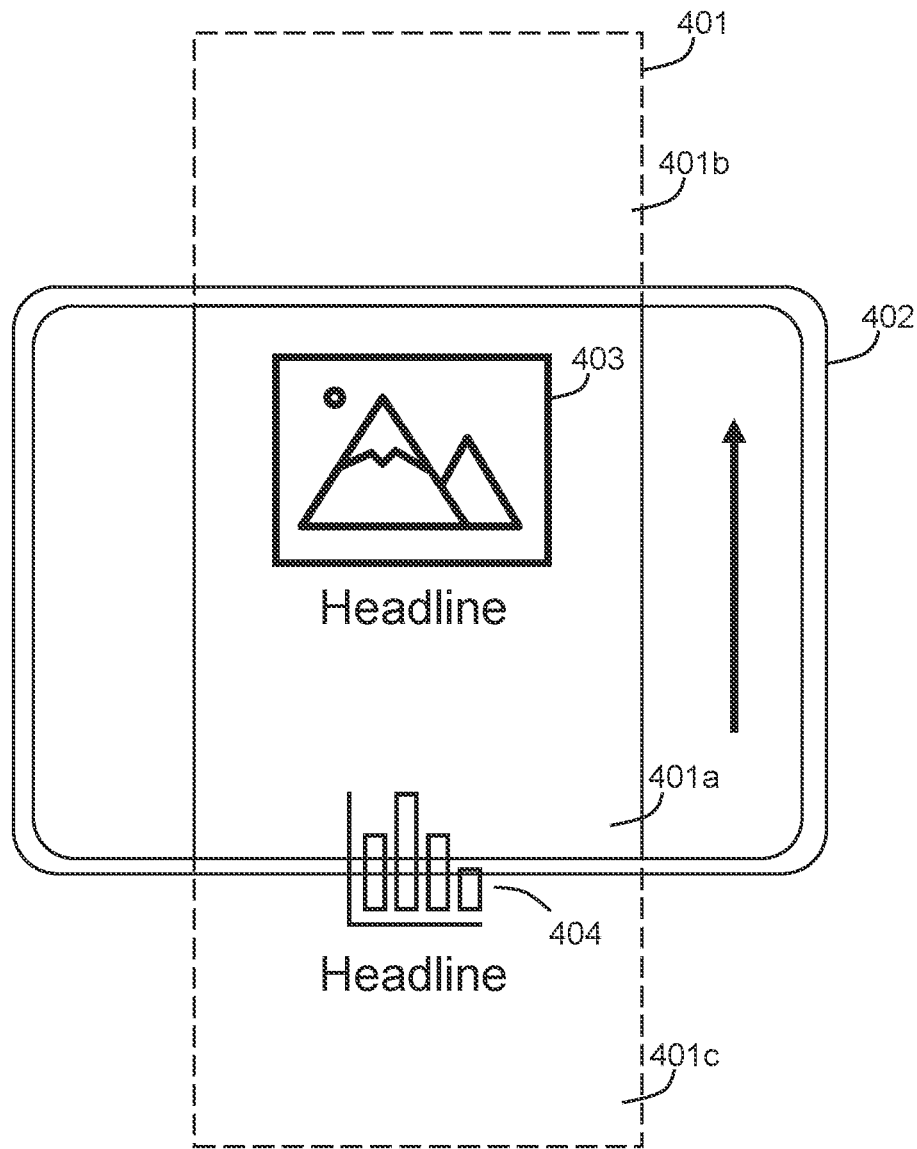
FIGS. 4A-4E illustrate an example embodiment of generating a user engagement score based on user scrolling behavior according to one or more embodiments.

FIG. 4A illustrates an electronic document 401 displayed in a viewport 402. The electronic document 401 includes a first content item 403, which is an image, and a second content item 404, which is a graph. The electronic document 401 includes a displayed portion 401a and non-displayed portions 401b and 401c. The non-displayed portions are shown as dashed lines in FIGS. 4A-4E for purposes of description. In an actual system, the non-displayed portions are stored as data until rendered by a display program controlling the display of images in the viewport 402.

The system detects a scroll event, indicated by the arrow, to move the content in the viewport in an upward direction.

Figure 4B:
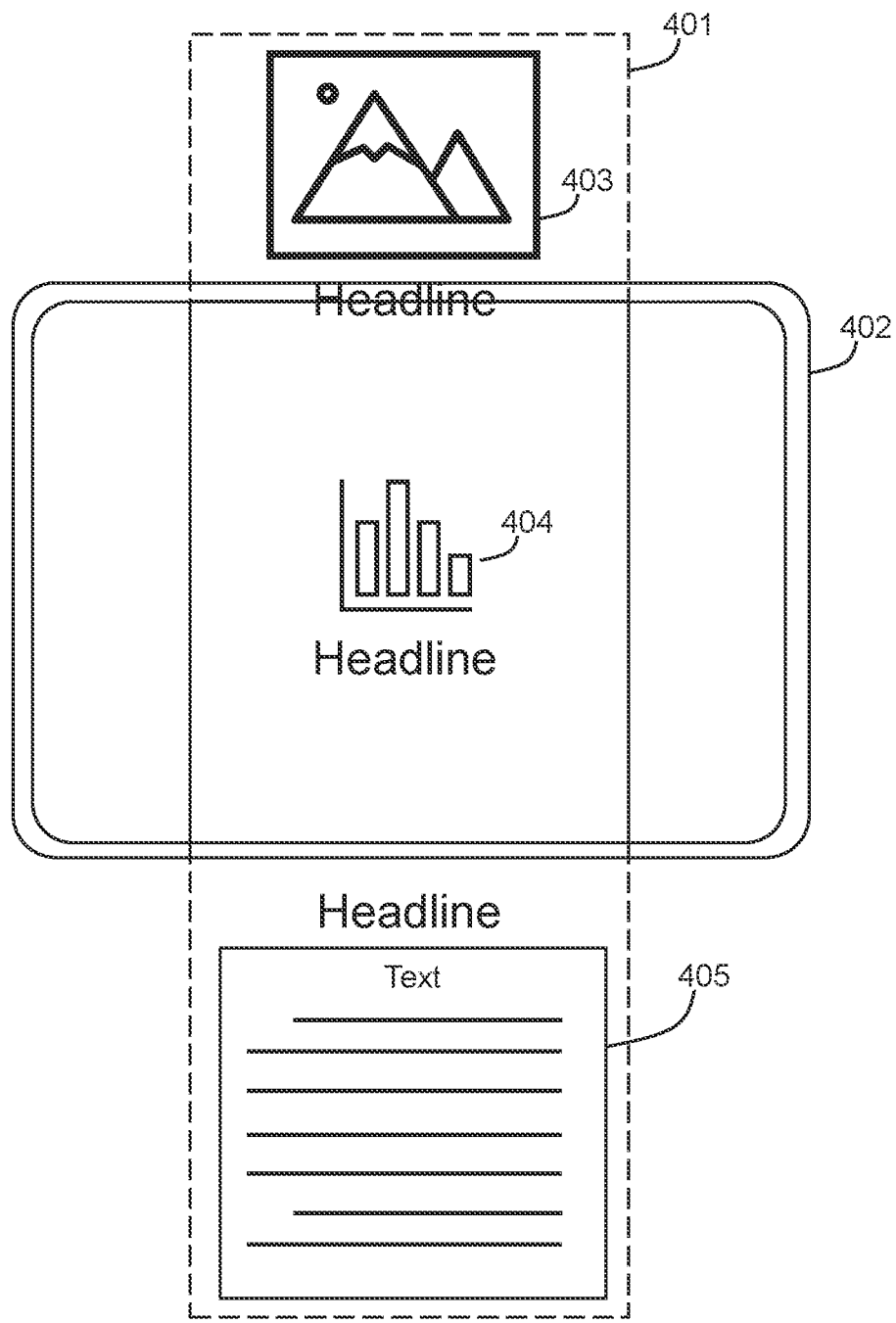

FIG. 4B illustrates a result of the scroll event. The content item 403 has been moved out of the viewport 402, the content item 404 is moved into the viewport 402, and the content item 405 is in a position to move into the viewport 402 based on a further upward scroll of the electronic document 401. Based on determining that the content item 404 is located in the viewport 402, the system starts a timer to track the amount of time that the content item 404 remains in the viewport.

Figure 4C:
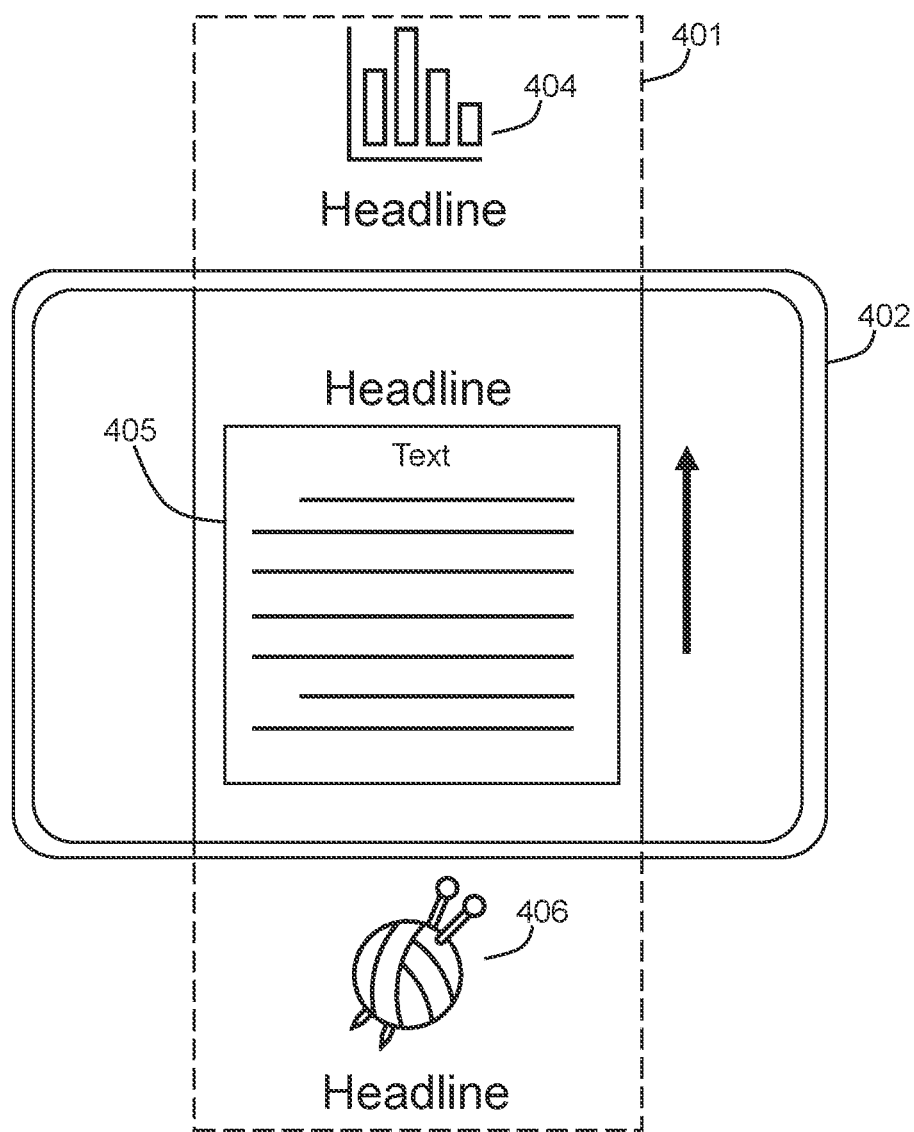

FIG. 4C illustrates a second scroll event. A user scrolls through the electronic document 401 to move the content upward. The content item 404 is no longer in the viewport 402. The content item 405 is moved into the viewport 405. Another content item 406 may be in a position to enter the viewport 402 based on further scrolling.

The system determines that the content item 404 is no longer in the viewport 402 and calculates a time interval that the content item 404 was in the viewport 402. Based on the time interval, the system generates an engagement score reflecting a level of engagement of the user with the content item 404. For example, if the system determines that the user spent ten (10) seconds with the content item 404 in the viewport, the system may assign a relatively high engagement score to the content item, reflecting a high likelihood that the user was interested in the content item 404. In contrast, if the system determines that the user scrolled quickly past the content item 404, spending one (1) second paused on the content item 404, the system may assign a relatively low score to the content item 404.

Figure 4D:
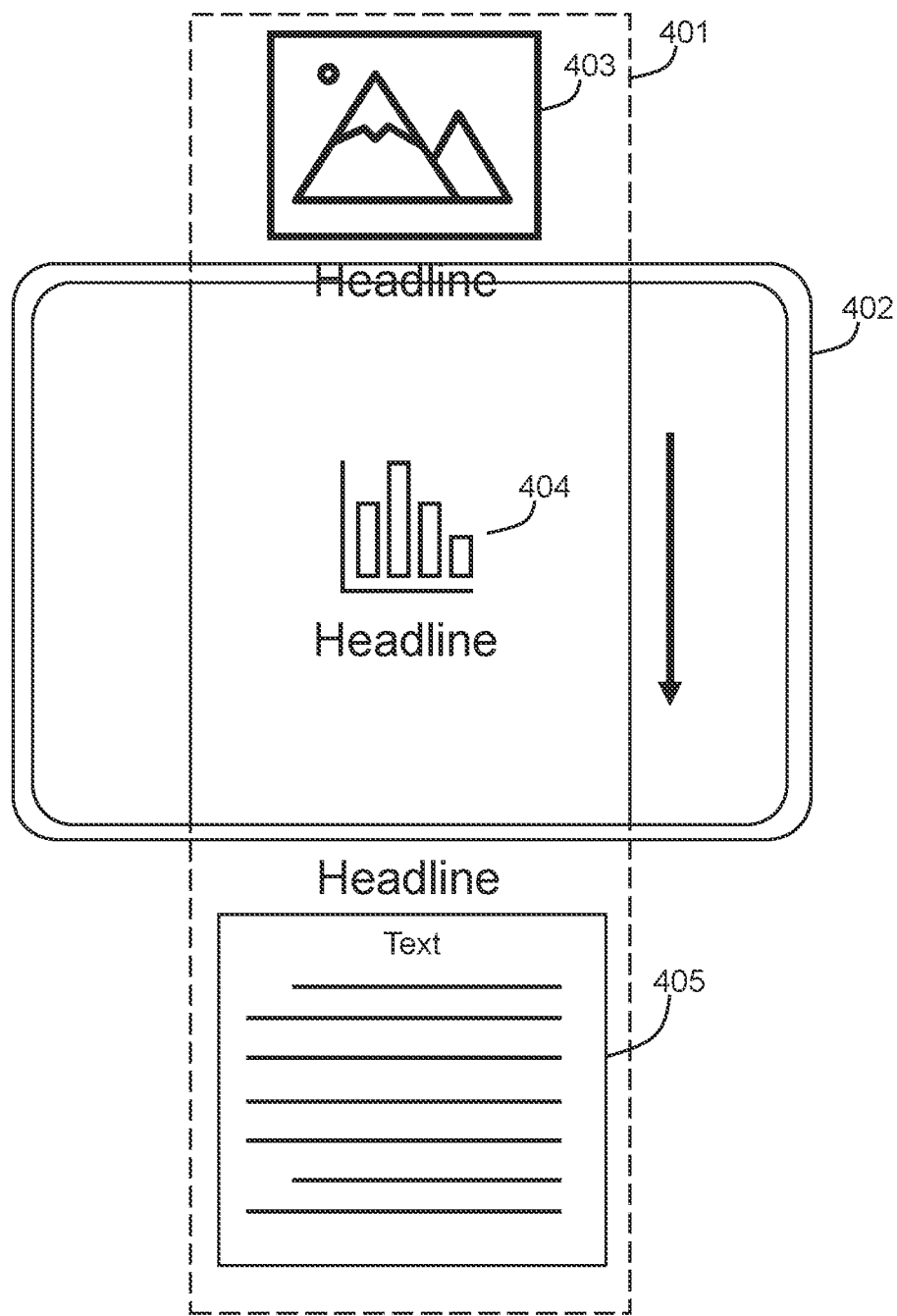

FIG. 4D illustrates a third scroll event. A user scrolls the electronic document 401 downward to move the content item 404 back into the viewport 402. The system detects that the content item 404 is back in the viewport and begins a timer to track the amount of time that the content item is in the viewport 402.

Figure 4E:
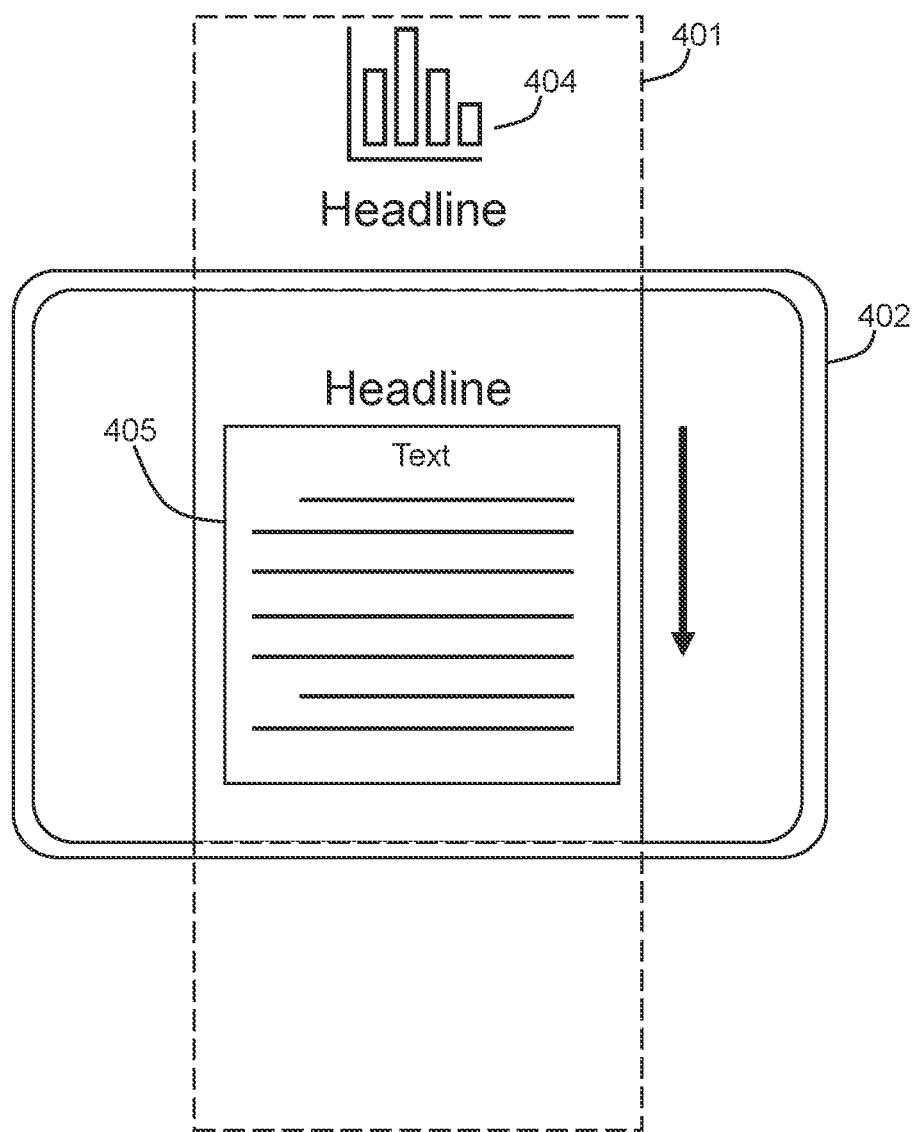

FIG. 4E illustrates a fourth scroll event. The system determines that the content item 404 is no longer in the viewport 402 and calculates the time interval that the content item 404 was located in the viewport 402. The system identifies the third and fourth scroll events as a "scroll-back" scrolling event. In a scroll-back scrolling event, the user scrolls past a content item, but scrolls back to view the content item. Since a scroll-back indicates that the user was interested in the content item, even when the content item was off-screen, the system assigns a relatively high engagement score to the content item 404.

In the example embodiment of FIGS. 4A-4E, the system detects the time interval that the content item is located in the viewport. In addition, or in the alternative, the system may identify a user-engagement region within the viewport, and the system may detect the time interval that content items are within the user-engagement region.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
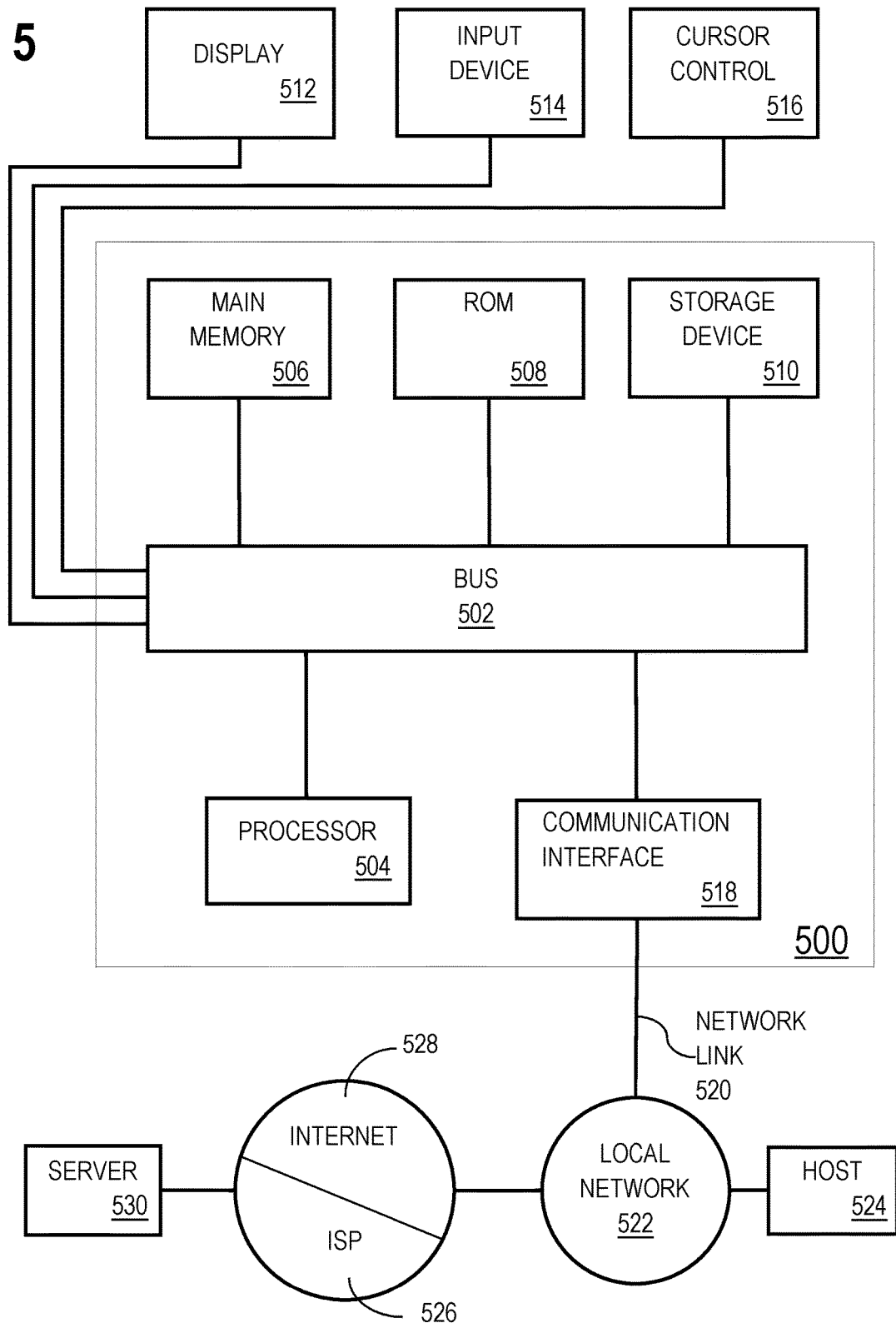
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    detecting a first scroll event, a second scroll event, a third scroll event, and a fourth scroll event associated with scrolling through an electronic document comprising a plurality of content items;
    determining that a first content item, of the plurality of content items comprised in the electronic document, was (a) not displayed in a viewport prior to the first scroll event and is (h) displayed in the viewport subsequent to the first scroll event;
    determining that the first content item was (a) displayed in the viewport prior to the second scroll event and (b) is not displayed in the viewport subsequent to the second scroll event;
    computing a first time interval between the first scroll event and the second scroll event;
    applying a set of one or more rules to the first time interval to compute a first engagement score for a user in relation to the first content item at least by:
    comparing the first time interval to a first expected range of time for viewing the first content item, wherein the first expected range of time is defined by a first duration of time between a first upper limit and a first lower limit, and wherein comparing the first time interval to the first expected range of time includes comparing the first time interval to the first upper limit and comparing the first time interval to the first lower limit;
    generating the first engagement score at a first value based on determining that the first time interval is within the first expected range of time;
    determining that a second content item, of the plurality of content items comprised in the electronic document, was (a) not displayed in a viewport prior to the third scroll event and is (b) displayed in the viewport subsequent to the third scroll event;
    determining that the second content item was (a) displayed in the viewport prior to the fourth scroll event and (b) is not displayed in the viewport subsequent to the fourth scroll event;
    computing a second time interval between the third scroll event and the fourth scroll event;
    applying the set of one or more rules to the second time interval to compute a second engagement score for the user in relation to the second content item at least by:
    comparing the second time interval to a second expected range of time for viewing the second content item, wherein the second expected range of time is defined by a second duration of time between a second upper limit and a second lower limit, and wherein comparing the second time interval to the second expected range of time includes comparing the second time interval to the second upper limit and comparing the second time interval to the second lower limit; and
    generating the second engagement score at a second value based on determining that the second time interval is within the second expected range of time;
    wherein the first value is higher than the second value.

2. The medium of claim 1, wherein the operations further comprise applying the set of one or more rules to the first time interval to compute the first engagement score.

3. The medium of claim 1, wherein the operations further comprise identifying a particular vertical position for use in determining whether the first content item is being displayed in the viewport or not being displayed in viewport, wherein the particular vertical position is identified at least by:
    detecting a user gaze position corresponding to a position of the user's eyeball during the first time interval;
    based on the user gaze position, determining a user focus position on the viewport;
    selecting the user focus position as the particular vertical position for use in determining whether the first content item is being displayed in the viewport.

4. The medium of claim 1, wherein determining that the first content item was displayed in the viewport comprises determining (a) the first content item is the only content item, of the plurality of content items, that is fully displayed in the viewport, or (b) the first content item is the only content item, of the plurality of content items, including any portion displayed in the viewport.

5. The medium of claim 1, wherein the operations further comprise:
    detecting a fifth scroll event associated with scrolling through the electronic document;
    determining that the first content item comprised in the electronic document was (a) not displayed in a viewport prior to the fifth scroll event and is (b) displayed in the viewport subsequent to the fifth scroll event;
    detecting a sixth scroll event associated with scrolling through the electronic document;
    determining that the first content item was (a) displayed in the viewport prior to the sixth scroll event and (b) is not displayed in the viewport subsequent to the sixth scroll event;
    computing a third time interval between the fifth scroll event and the sixth scroll event;
    wherein the set of one or more rules is applied to the first time interval and the third time interval to compute the first engagement score for the user in relation to the first content item.

6. The medium of claim 5, wherein responsive to detecting the fifth scroll event, determining that the user scrolled away from, and back to, the first content item,
    wherein the first engagement score is computed based at least in part on determining that the user scrolled away from, and back to, the first content item.

7. The medium of claim 1, wherein the first expected range of time for the first content item is based on attributes of the first content item.

8. The medium of claim 1, wherein the first expected range of time or the first content item is based on prior interactions with the first content item.

9. The medium of claim 1, further comprising:
    computing the first engagement score based on a plurality of factors, the plurality of factors comprising the first time interval.

10. The medium of claim 9, wherein the plurality of factors further comprises at least one of:
    a user interaction with the first content item;
    prior interactions with the first content item;
    a type of content of the first content item;
    a determination a scroll-back event occurred to scroll back to the first content item after scrolling away from the first content item.

11. The non-transitory computer readable medium of claim 1, wherein the operations further comprise:
  detecting a fifth scroll event and a sixth scroll event associated with scrolling through the electronic document;
  determining that a third content item comprised in the electronic document was (a) not displayed in the viewport prior to the fifth scroll event and is (b) displayed in the viewport subsequent to the fifth scroll event;
  determining that the third content item (a) was displayed in the viewport prior to the sixth scroll event and (b) is not displayed in the viewport subsequent to the sixth scroll event;
  computing a third time interval between the fifth scroll event and the sixth scroll event;
  wherein the set of one or more rules is applied to the third time interval to compute a third engagement score for the user in relation to the first content item,
  wherein applying the set of rules further comprises:
    comparing the third time interval to a third expected range of time for viewing the third content item,
    wherein comparing the third time interval to the third expected range of time includes comparing the third time interval to a third upper limit and comparing the third time interval to a third lower limit; and
    generating the third engagement score at a third value, lower than the first value, based on determining that the third time interval is shorter than the third lower limit of the third expected range of time.

12. A non-transitory computer readable medium comprising instructions which, when executed by one or more hardware processors, causes performance of operations comprising:
  detecting a first scroll event, a second scroll event, a third scroll event, and a fourth scroll event associated with scrolling through an electronic document comprising a plurality of content items;
  determining that a first content item, of the plurality of content items comprised in the electronic document, was (a) not displayed in an engagement region of a viewport prior to the first scroll event and is (b) displayed in the engagement region of the viewport subsequent to the first scroll event;
  determining that the first content item was (a) displayed in the engagement region of the viewport prior to the second scroll event and (b) is not displayed in the engagement region of the viewport subsequent to the second scroll event;
  computing a first time interval between the first scroll event and the second scroll event;
  applying a set of one or more rules to the first time interval to compute a first engagement score for a user in relation to the first content item at least by:
    comparing the first time interval to a first expected range of time for viewing the first content item, wherein the first expected range of time is defined by a first duration of time between a first upper limit and a first lower limit, and wherein comparing the first time interval to the first expected range of time includes comparing the first time interval to the first upper limit and comparing the first time interval to the first lower limit;
    generating the first engagement score at a first value based on determining that the first time interval is within the first expected range of time;
  determining that a second content item, of the plurality of content items comprised in the electronic document, was (a) not displayed in the engagement region prior to the fourth scroll event and is (b) displayed in the engagement region subsequent to the second scroll event;
  determining that the second content item was (a) displayed in the engagement region prior to the fourth scroll event and is (b) not displayed in the engagement region subsequent to the fourth scroll event;
  computing a second time interval between the third scroll event and the fourth scroll event;
  applying the set of one or more rules to the second time interval to compute a second engagement score for the user in relation to the second content item at least by:
    comparing the second time interval to a second expected range of time for viewing the second content item, wherein the second expected range of time is defined by a second duration of time between a second upper limit and a second lower limit, and wherein comparing the second time interval to the second expected range of time includes comparing the second time interval to the second upper limit and comparing the second time interval to the second lower limit; and
    generating the second engagement score at a second value based on determining that the second time interval is within the second expected range of time;
  wherein the first value is higher than the second value,
  wherein the first time interval, used for computing the first engagement score, does not include a period of time during which the first content item was displayed in a second region of the viewport that does not correspond to the engagement region of the viewport, and
  wherein the viewport corresponds to a display comprising the engagement region and the second region, wherein the engagement region is different from the second region.

13. The medium of claim 12, wherein the operations further comprise determining the engagement region for the viewport at least by:
  identifying a plurality of historical content items displayed at various corresponding vertical positions within the viewport;
  identifying a first subset of the plurality of historical content items selected by the user and a second subset of the plurality of historical content items not selected by the user;
  determining the engagement region based on the vertical positions corresponding to each of the first subset of historical content items.

14. The medium of claim 12, wherein the operations further comprise:
  determining the engagement region for the viewport by applying a machine learning model, wherein the machine learning model:
    identifies a plurality of historical content items displayed at various corresponding vertical positions within the viewport;
    identifies a first subset of the plurality of historical content items selected by the user and a second subset of the plurality of historical content items not selected by the user;
    determines the engagement region based on the vertical positions corresponding to each of the first subset of historical content items.

15. A method, comprising:
  detecting a first scroll event, a second scroll event, a third scroll event, and a fourth scroll event associated with scrolling through an electronic document comprising a plurality of content items;
  determining that a first content item, of the plurality of content items comprised in the electronic document, was (a) not displayed in a viewport prior to the first scroll event and is (b) displayed in the viewport subsequent to the first scroll event;
  determining that the first content item was (a) displayed in the viewport prior to the second scroll event and (b) is not displayed in the viewport subsequent to the second scroll event;
  computing a first time interval between the first scroll event and the second scroll event;
  applying a set of one or more rules to the first time interval to compute a first engagement score for a user in relation to the first content item at least by:
    comparing the first time interval to a first expected range of time for viewing the first content item, wherein the first expected range of time is defined by a first duration of time between a first upper limit and a first lower limit, and wherein comparing the first time interval to the first expected range of time includes comparing the first time interval to the first upper limit and comparing the first time interval to the first lower limit;
    generating the first engagement score at a first value based on determining that the first time interval is within the first expected range of time;
  determining that a second content item, of the plurality of content items comprised in the electronic document, was (a) not displayed in a viewport prior to the third scroll event and is (b) displayed in the viewport subsequent to the third scroll event;
  determining that the second content item was (a) displayed in the viewport prior to the fourth scroll event and (b) is not displayed in the viewport subsequent to the fourth scroll event;
  computing a second time interval between the third scroll event and the fourth scroll event;
  applying the set of one or more rules to the second time interval to compute a second engagement score for the user in relation to the second content item at least by:
    comparing the second time interval to a second expected range of time for viewing the second content item, wherein the second expected range of time is defined by a second duration of time between a second upper limit and a second lower limit, and wherein comparing the second time interval to the second expected range of time includes comparing the second time interval to the second upper limit and comparing the second time interval to the second lower limit; and
    generating the second engagement score at a second value based on determining that the second time interval is within the second expected range of time;
  wherein the first value is higher than the second value.

16. The method of claim 15, further comprising: applying the set of one or more rules to the first time interval to compute the first engagement score.

17. The method of claim 15, further comprising: identifying a particular vertical position for use in determining whether the first content item is being displayed in the viewport or not being displayed in viewport, wherein the particular vertical position is identified at least by:
  detecting a user gaze position corresponding to a position of the user's eyeball during the first time interval;
  based on the user gaze position, determining a user focus position on the viewport;
  selecting the user focus position as the particular vertical position for use in determining whether the first content item is being displayed in the viewport.

18. The method of claim 15, wherein determining that the first content item was displayed in the viewport comprises determining the first content item is the only content item, of the plurality of content items, that is fully displayed in the viewport.

19. The method of claim 15, further comprising:
  detecting a fifth scroll event associated with scrolling through the electronic document;
  determining that the first content item comprised in the electronic document was (a) not displayed in a viewport prior to the fifth scroll event and is (b) displayed in the viewport subsequent to the fifth scroll event;
  detecting a sixth scroll event associated with scrolling through the electronic document;
  determining that the first content item was (a) displayed in the viewport prior to the sixth scroll event and (b) is not displayed in the viewport subsequent to the sixth scroll event;
  computing a third time interval between the fifth scroll event and the sixth scroll event;
  wherein the set of one or more rules is applied to the first time interval and the third time interval to compute the first engagement score for the user in relation to the first content item.

20. The method of claim 19, wherein responsive to detecting the fifth scroll event, determining that the user scrolled away from, and back to, the first content item,
  wherein the first engagement score is computed based at least in part on determining that the user scrolled away from, and back to, the first content item.

21. A method, comprising:
  detecting a first scroll event, a second scroll event, a third scroll event, and a fourth scroll event associated with scrolling through an electronic document comprising a plurality of content items;
  determining that a first content item, of the plurality of content items comprised in the electronic document, was (a) not displayed in an engagement region of a viewport prior to the first scroll event and is (b) displayed in the engagement region of the viewport subsequent to the first scroll event;
  determining that the first content item was (a) displayed in the engagement region of the viewport prior to the second scroll event and (b) is not displayed in the engagement region of the viewport subsequent to the second scroll event;
  computing a first time interval between the first scroll event and the second scroll event;
  applying a set of one or more rules to the first time interval to compute a first engagement score for a user in relation to the first content item at least by:
    comparing the first time interval to a first expected range of time for viewing the first content item, wherein the first expected range of time is defined by a first duration of time between a first upper limit and a first lower limit, and wherein comparing the first time interval to the first expected range of time includes comparing the first time interval to the first upper limit and comparing the first time interval to the first lower limit;

generating the first engagement score at a first value based on determining that the first time interval is within the first expected range of time;

determining that a second content item, of the plurality of content items comprised in the electronic document, was (a) not displayed in the engagement region prior to the fourth scroll event and is (b) displayed in the engagement region subsequent to the second scroll event;

determining that the second content item was (a) displayed in the engagement region prior to the fourth scroll event and is (b) not displayed in the engagement region subsequent to the fourth scroll event;

computing a second time interval between the third scroll event and the fourth scroll event;

applying the set of one or more rules to the second time interval to compute a second engagement score for the user in relation to the second content item at least by:

comparing the second time interval to a second expected range of time for viewing the second content item, wherein the second expected range of time is defined by a second duration of time between a second upper limit and a second lower limit, and wherein comparing the second time interval to the second expected range of time includes comparing the second time interval to the second upper limit and comparing the second time interval to the second lower limit; and generating the second engagement score at a second value based on determining that the second time interval is within the second expected range of time;

wherein the first value is higher than the second value, wherein the first time interval, used for computing the first engagement score, does not include a period of time during which the first content item was displayed in a second region of the viewport that does not correspond to the engagement region of the viewport, and wherein the viewport corresponds to a display comprising the engagement region and the second region, wherein the engagement region is different from the second region.

* * * * *

UNITED STATES PATENT AND TRADEMARK OFFICE
CERTIFICATE OF CORRECTION

PATENT NO.         : 11,675,492 B2
APPLICATION NO.    : 17/150749
DATED              : June 13, 2023
INVENTOR(S)        : Rodgers It is certified that error appears in the above-identified patent and that said Letters Patent is hereby corrected as shown below:

In the Specification

In Column 3, Line 12, delete "Specification" and insert -- specification --, therefor.

In Column 10, Lines 6-7, delete "Operation 212" and insert -- (Operation 212) --, therefor.

In the Claims

In Column 19, Line 19, in Claim 1, delete "(h)" and insert -- (b) --, therefor.

In Column 20, Line 54, in Claim 8, delete "or" and insert -- for --, therefor.

In Column 20, Line 64, in Claim 10, delete "item;" and insert -- item; and --, therefor.

Signed and Sealed this
Second Day of April, 2024

Katherine Kelly Vidal
*Director of the United States Patent and Trademark Office*